(No Model.)

A. MORCK, Jr.
SPECTACLES.

No. 392,053. Patented Oct. 30, 1888.

Attest,
W. E. Bowen,
L. Hopper.

Inventor:
August Morck, Jr.,
By J. E. M. Bowen
Atty.

UNITED STATES PATENT OFFICE.

AUGUST MORCK, JR., OF WARREN, PENNSYLVANIA.

SPECTACLES.

SPECIFICATION forming part of Letters Patent No. 392,053, dated October 30, 1888.

Application filed December 15, 1887. Serial No. 257,959. (No model.)

*To all whom it may concern:*

Be it known that I, AUGUST MORCK, Jr., a citizen of the United States, and a resident of Warren, in the county of Warren and State of Pennsylvania, have invented certain new and useful Improvements in Spectacles or Eyeglasses, of which the following is a specification.

This invention has reference to certain improvements in spectacles or eyeglasses; and its object is to render more effective such spectacles or eyeglasses as are employed for combined near and far range purposes.

Glasses designed exclusively for far vision are ground to conform to the peculiar requirements of the eyes of the person by whom they are to be used, and the conformation of the lenses may be cylindrical, spherical, spherocylindrical, or they may be ground with prisms.

My invention is applicable to any of the above styles of lenses; and it consists in securing upon the lower surface of the selected far-vision lens a spherically-ground lens of about one-fourth to one-third of the surface of the larger lens, and which is selected with a view to near-vision purposes, and when combined with the larger lens in the manner stated produces a glass adapted for use for both close and distant range. When the two lenses are united, as stated, the larger or far-vision lens extends to the lower rim of the inclosing-frame on both sides of the near-vision lens.

The invention is hereinafter described, and the features of novelty are pointed out in the claims at the end of this specification.

Figure 1:
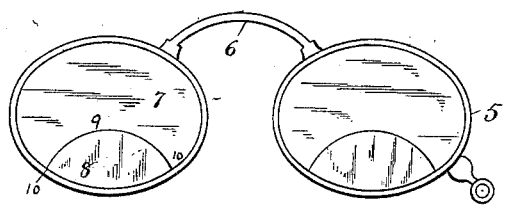
Figure 2:
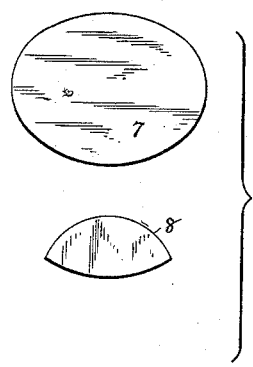
Figure 3:
Figure 4:

In the accompanying drawings, which form a part of this description, and in which like features are indicated by like figures of reference in the several views, Figure 1 represents a pair of eyeglasses embodying my improvement. Fig. 2 is a plan view of the far and near vision lenses separated. Fig. 3 represents a central cross-section through the combined lenses of Fig. 1, and Fig. 4 is a central cross-section through a glass constructed so as to produce a double-cone lens.

In the drawings, 5 indicates the frames by which the glasses are held, and 6 the bridge joining the frames in the usual manner. The far-vision lens is designated by 7 and the near-vision lens by 8. The larger lens, 7, Fig. 1, is one of the common forms in which far-vision lenses are often ground, and upon the lower surface of this lens the small spherical lens, 8, is cemented by diamond or other suitable cement. The smaller lens, 8, will preferably be about one-fourth to one-third the surface of the larger lens upon which it is cemented, as indicated in the drawings. In this manner there is produced a glass adapted for use in reading or writing, or for other near-vision purposes, and also for the usual far-vision purposes, and this manner of combining the two lenses is simple and inexpensive. A small spherically-ground lens, as 8, is equally applicable to any of the above-specified forms of far-vision lenses for the purpose of producing a combined far and near vision glass in a single structure.

When cone-lenses are required—that is, lenses in which the glass is ground so as to be thickest in the center, that the rays of light may be deflected toward the center—the smaller lens, 8, is so shaped in grinding that when it is cemented to the larger cone-shaped lens there is produced two perfect cone-lenses in one glass, the larger for far vision and the smaller for near vision. This construction is shown in Fig. 4 of the drawings.

For a more particular description of my improvement, and referring to Fig. 2, it will be seen that the near-vision lens does not form an equal part of the entire lens, and does not therefore form a half-lens; but it is a segment of a circle, the bounding-line 9 whereof joins the lower edge of the far-vision lens at the points 10 10 below the middle line and equally on each side of a vertical axis, which gives the advantage of an increased field-vision through the lens 7, comprehending an area of about two-thirds the far-seeing vision lens—that is to say, all its upper portion including its end parts below the horizontal diameter-line—while the area of the near vision is confined to the lower middle part of the lens 7, and is therefore better suited for near-vision range. This construction, in fact, gives two complete lenses and avoids the objection of a horizontal dividing-line, which has hitherto formed the division of the foci.

Referring to Figs. 2 and 3, it will be seen that the near-vision lens 8, while having its edge bounded by a curved line of which every part is equally distant from a center, which is preferably just outside of the rim at the lower side of the frame, is made to taper to a feather-edge along the segmental line, and therefore the lens 8 has its thickest part along the lower edge. This construction obliterates the surface-line 9 to the sight, while giving a perfectly-defined area of near vision. It avoids the objection of a horizontal straight projecting ledge, which forms a shelf for the collection of dirt and dust when such near-vision lens is formed thickest at such straight line; and it makes the change from a far-vision to a near-vision lens gradual as the eye crosses the segmental line at its highest point on the surface of the far-seeing lens.

Comparing the horizontal straight division-line with the segmental line in a lens-face, the latter is more natural and acceptable to the eye. It forms a softer transition from one lens to the other, and therefore is not so trying to the eye as the old-style sharply-defined straight division-line. It is, moreover, important to provide a wide field of vision for the far sight, while a narrower field is only necessary for the near sight, and therefore the segmental boundary-line of the smaller near-vision lens is the most natural, and such lens fills all its requirements without interfering with or encroaching upon the large field of the far-vision lens.

Referring to the lens 7, it will be seen that while it is of the usual full oval form its vision-field is by my improvement made of crescent form, while the near-vision lens has its dividing-line bounding the concave line of the crescent and terminates at the horns thereof. This construction, while giving a large and unobstructed field view for the wearer in walking, obviates, by reason of the concavo-convex division-line, the effect of dizziness, which is produced by the horizontal straight dividing-line of two visual fields of equal area.

I do not claim a bifocal lens consisting of a whole lens for far vision supplemented by a half-lens for near vision; but the precise improvement above set out has advantages and produces results which cannot be obtained by bifocal lenses hitherto proposed, in which the area of both foci is equal and the division-line forming abrupt and harsh transition from one to the other.

Having thus described my invention, what I claim as new, and desire to secure by Letters Patent, is—

1. The bifocal lens herein described, consisting of the lens 7, having a far-vision field of crescent form supplemented by a lens, 8, of near vision having its dividing-line 9 bounding the concave line of the crescent field and terminating at the horns 10 10 thereof, as shown, and for the purpose stated.

2. The bifocal lens herein described, consisting of the lens 7 of far vision supplemented by a segmental lens, 8, of near vision having about one-third the area of the far-vision lens and tapering to a feather-edge at the surface segmental line 9, substantially as described, for the purpose stated.

3. In spectacles, the combination of the usual far vision lens, 7, with a relatively small near-vision lens having a conical face and supplementing the lower portion of the lens 7, substantially as described.

4. The combination, with the usual far-vision lens having one of its faces ground conical, of a relatively small near-vision lens which is ground to deflect rays of light toward its center, substantially as described, for the purpose specified.

5. In bifocal lenses, the far-vision lens 7, supplemented by a near-vision lens, 8, tapering to a feather-edge at the dividing-line, as described, and for the purpose specified.

Signed at Warren, in the county of Warren, and State of Pennsylvania, this 22d day of November, A. D. 1887.

AUGUST MORCK, Jr.

Witnesses:
 E. WALKER,
 GEO. H. HIGGINS.